United States Patent Office 3,128,080
Patented Apr. 7, 1964

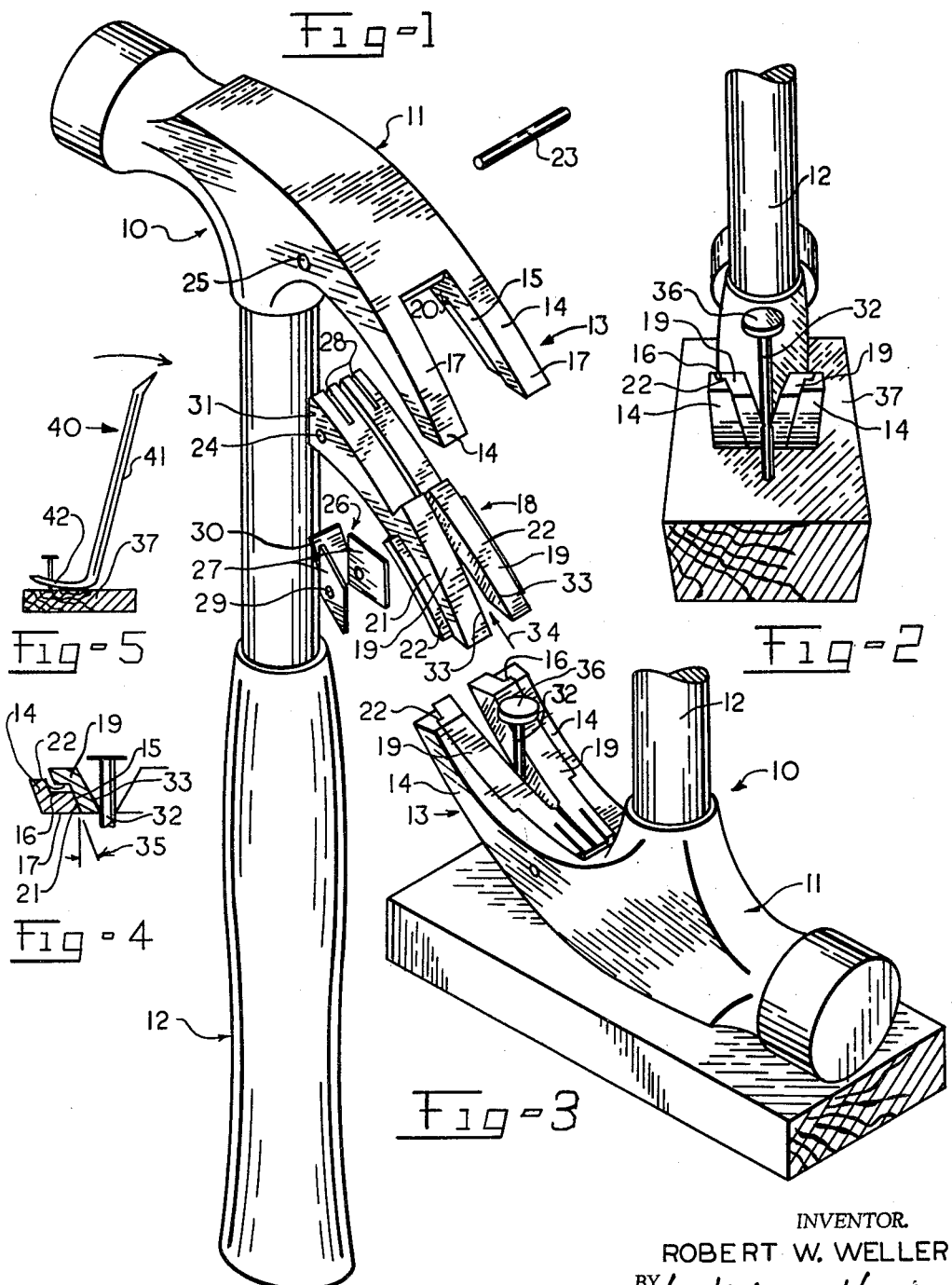

3,128,080
CLAW HAMMER
Robert W. Weller, 26017 Eshelman Ave., Lomita, Calif.
Filed Feb. 26, 1962, Ser. No. 175,742
8 Claims. (Cl. 254—24)

This invention relates generally to nail pulling devices and more particularly concerns improvements in devices such as hammers, wrecking bars and the like characterized as solving certain problems encountered in the use of known devices of this nature.

Conventional hammers and wrecking bars incorporate a one piece head having a nail pulling claw functioning to pull a driven nail when the handle of the device is rocked as by force application to the handle lever. Depending upon the size and strength of the nail and the type of material into which it is driven, it is not uncommon to encounter difficulty in pulling the nail occasioned by stripping of the nail head by the claw. Typically the fulcrum or pivot point moves further away from the nail, thereby requiring either blocking to return the pivot point closer to the nail or more effort must be applied to the handle to overcome the mechanical disadvantage. Also, the nail is frequently chewed up or damaged by the claw making it much more difficult to engage the claw with the nail stub with sufficient grip to pull the nail. While certain devices have been proposed in the past as a result of attempts to solve these and similar problems, I am not aware that such devices have met the needs for a device as simple and desirable as the present invention.

It is a major object of the invention to provide a nail pulling device characterized in its construction and operation as solving the problems mentioned above. Broadly speaking, the device may be characterized as comprising a head unit to be rocked by a handle lever, as for example the handle of a hammer, wrecking bar or the like type implement together with means carried by the head and including a claw element movable relative to the head so as to transmit to a nail shank biting force which increases as force is applied to the handle in a nail pulling sense tending to pull the handle away from the claw element. Preferably, the claw element has wedge acting interengagement with the head and in particular the claw may be characterized as being capable of energization in response to rocking of the head in nail pulling sense so that the claw will bite into the nail shank with increasing effect but without severing the nail as the handle is rocked. One method of preventing severing of the nail by the energized claw is to provide stop shoulders located on the head and claw to interengage and thereby limit such extreme claw movement relative to the head as would result in severing of a nail.

It is another object of the invention to provide a device of the character broadly described above wherein the head forms what may be termed first terminal claw means, with an insert being carried by the head and including what may be termed second terminal claw means nesting in an cooperating with the first terminal claw means in a novel manner so as to become energized thereby to grip a nail shank with increasing force in response to force transmission from the first to the second claw means during rocking of the head in nail pulling sense. This construction enables the user to operate the device in essentially the same manner that he would operate a conventional hammer or wrecking bar, but with the added benefits of being able to pull nails with ease using the full mechanical leverage without the use of blocks, and without stripping nail heads or severing nails. These and other results and advantages of the invention may appropriately be described as surprising in view of the simplicity and effectiveness of the device to solve the problems discussed above.

These and other objects and advantages of the invention, as well as the details of an illustrative embodiment, will be more fully understood from the following detailed description of the drawings, in which:

FIG. 1 is a perspective showing of a hammer incorporating the invention with the claw elements exploded or disassembled from the head;

FIG. 2 shows in elevation the operation of the claw and head structure during pulling of a nail;

FIG. 3 is a perspective showing of the head and claw structure during pulling of a nail;

FIG. 4 is a cross section taken through the head and claw structure in de-energized state; and FIG. 5 shows the application of the invention to a wrecking bar or the like.

Referring first to FIG. 1 the hammer 10 is shown to include a head unit 11 to be rocked by a handle 12, the head extending generally transversely with respect to the axis of the handle. The head at one side of the handle locus forms what may be characterized as first terminal claw means 13 having a first pair of spaced elongated tines 14 provided with wedge surfaces 15 and stop shoulders 16 as better seen in FIG. 4. The wedge surfaces 15 taper in the direction toward the outer sides or faces 17 of the tines, whereas the stop shoulders 16 are presented generally toward the inner side of the head.

In accordance with the invention, means is provided to be carried by the head, and includes a claw element movable relative to the head so as to transmit to a nail shank biting force which increases as the head is rocked in nail pulling sense tending to pull the handle away from the claw element. One form of such means is shown in FIG. 4 as including what may be termed second terminal claw means 18 having a second pair of spaced elongated tines 19 sized to fit in a recess 20 formed in the head with the second pair of tines 18 extending or nesting in the space between the first pair of tines 14. The second pair of tines likewise have wedge shoulders 21 for wedge acting interengagement with the shoulders 15 of the tines 14 which are part of the head claw 13. In addition, the second pair of tines have stop shoulders 22 facing toward the stop shoulders 16 as better seen in FIG. 4 so as to come into interengagement therewith and thereby limit relative closing together of the tines 19 as will be described.

The second pair of tines when received in the recess 20 and in the space between the first tines 14 are pivoted so as to be movable relative to the head, one form of pivoting being shown as embodying a pin 23 received through drilled openings 24 and 25 in the tines 19 and the head. Accordingly, the second claw means 18 when combined with the head structure is supported to fulcrum on the head about an axis, i.e. the pin axis, which is generally normal to the plane of rocking of the head in nail pulling sense. It is understood that provision may be made for supporting the second claw means by structure other than a pivot pin, so long as the desired function and result is accomplished.

Furthermore, the insert structure not only includes the second pair of tines but also includes what may be characterized as a flexure pivot 26 connected to the second pair of tines as by thin plates 27 fitting into the plate slots 28 formed in the inboard terminal of the tines 19, the plates having drilled openings 29 to receive the pin 23. A bridge plate 30 integral with the plates 27 fits against the inboard faces 31 of the tines 19 and is adapted to flex to permit relative closure of the tines 19, while resisting such closure in order to maintain the tines desirably spread apart in de-energized state.

Coming now to a description of the operation, reference is first made to FIG. 4 showing a nail shank 32 received between the pairs of tines 14 and 19 with the latter advanced sufficiently to bring the biting edges 33 thereof into engagement with the opposite sides of the nail shank. In this regard, it will be seen that the edges 33 taper generally rearwardly in the direction of the arrow 34 in FIG. 1, the arrow being directed inboard. Rocking of the handle 12 and the head 11 in nail pulling sense is seen to pull the head structure including the head claw tines 14 upwardly away from the claw tines 19 as viewed in FIGS. 2, 3 and 4. Such rocking produces energization of the second claw tines 19 by camming action at the cam surfaces 15 and 21, the angularity of which with respect to vertical as indicated at 35 in FIG. 4 (i.e. a plane with respect to which the tines are symmetrical) being such as to cause the edges 33 increasingly to bite into the nail shank 32 so as to prevent slippage of the second claw structure upwardly with respect to the nail shank. With the hammer generally shaped as shown in the drawing the angularity indicated at 35 has been found to be rather critical, a 15 degree angularity giving the desired results. If such angularity deviates substantially from 15 degrees desired results are not obtained. With increasingly lesser angularity force exertion on the hammer handle results in severing of the nail shank, whereas with increasingly greater angularity the desired slippage at the interfaces 15 and 21 does not occur.

FIGS. 2 and 3 show the configuration when the stop shoulders 16 and 22 have come into interengagement preventing severing of the nail by the biting edges 33 of the second claw tines 19. Continued rocking of the handle in nail pulling sense results in positive pulling of the nail without slippage of the claw structure along the nail shank, and without risk of stripping the nail head 36. The nail may be worked loose from the base 37 in which it has been driven by repeated biting of the claw structure into the nail shank at ratchet intervals along the shank, all without danger of severing the nail or stripping the nail head 36, since it is assured that the claw structure will bite into the nail at the point where the shank 32 is brought into engagement with the biting edges 33 of the claw tines 19.

While a clip type flexure pivot structure has been illustrated and described, it is contemplated that the inboard end portions of the elongated tines 19 may be interconnected by other structure, as for example by a bridge which is integral with the tines providing a one piece secondary claw structure 18.

FIG. 5 shows a wrecking bar 40 having a handle 41 and a head 42, the latter being formed typically as described above in connection with the hammer in order to carry the secondary claw structure 18 as previously described.

I claim:

1. An improved nail pulling device, comprising a head unit to be rocked by a handle, the head at one side of the handle locus forming first terminal claw means having relatively short tines the roots of which are joined by a transversely thickened section of the head spaced a substantial distance from the handle locus, and other means carried by the head including second terminal claw means located in such force transmitting relationship to said first claw means that said second claw means becomes energized to increasingly grip a nail shank in response to force transmission thereto from said first claw means during rocking of said head in nail pulling sense, said other means being pivotally mounted on said head at a locus spaced from said second and away from the tines and so that said second claw means is received within said first claw means.

2. An improved nail pulling device, comprising a head unit to be rocked by a handle, the head at one side of the handle locus forming first terminal claw means having relatively short tines the roots of which are joined by a transversely thickened section of the head spaced a substantial distance from the handle locus, and insert means carried by the head and including second terminal claw means located in such force transmitting relationship to said first claw means that said second claw means becomes energized to increasingly grip a nail shank projecting through said first and second claw means in response to force transmission from said first claw means to said second claw means during rocking of said head in nail pulling sense, said second claw means having a second pair of spaced tines extending in the space between said first pair of tines, said second tines having inward extensions pivotally mounted on the head at a pivot locus spaced from said section and away from the first tines.

3. The invention as defined in claim 2 in which said first and second pairs of tines have interengaged wedge shoulders for transmitting said force to urge the second tines relatively toward one another, the angularity of said shoulders on at least one pair of said tines from a plane with respect to which said tines are symmetrical being about 15°.

4. The invention as defined in claim 3 including pivot means supporting said second claw means to fulcrum on said head about an axis generally normal to the plane of rocking of said head in nail pulling sense.

5. The invention as defined in claim 3 in which said insert means includes a flexure pivot interconnecting said second tines to urge them respectively apart and toward said first tines.

6. The invention as defined in claim 5 in which said head and insert means have interengageable stop shoulders for limiting said fulcruming when said second tines have closed toward one another but remain spaced apart, said stop shoulders being disengaged when said second claw means is de-energized.

7. The invention as defined in claim 4 in which said device comprises a hammer.

8. The invention as defined in claim 4 in which said device comprises a wrecking bar.

References Cited in the file of this patent

UNITED STATES PATENTS

| | | |
|---|---|---|
| 590,368 | Harriman et al. | Sept. 21, 1897 |
| 1,017,491 | Ansley | Feb. 13, 1912 |
| 1,215,012 | Finney | Feb. 6, 1917 |
| 1,487,080 | Thompson | Mar. 18, 1924 |
| 2,966,334 | Thurman | Dec. 27, 1960 |

FOREIGN PATENTS

| | | |
|---|---|---|
| 98,664 | Germany | Aug. 31, 1898 |

UNITED STATES PATENT OFFICE
CERTIFICATE OF CORRECTION

Patent No. 3,128,080 April 7, 1964

Robert W. Weller

It is hereby certified that error appears in the above numbered patent requiring correction and that the said Letters Patent should read as corrected below.

Column 4, line 5, for "second" read -- section --.

Signed and sealed this 4th day of August 1964.

(SEAL)
Attest:

ERNEST W. SWIDER
Attesting Officer

EDWARD J. BRENNER
Commissioner of Patents